Sept. 18, 1923. 1,468,526
J. TERROINE
IMPLEMENT FOR COMPRESSING THE VALVE SPRINGS OF INTERNAL COMBUSTION ENGINES
Filed June 16, 1922
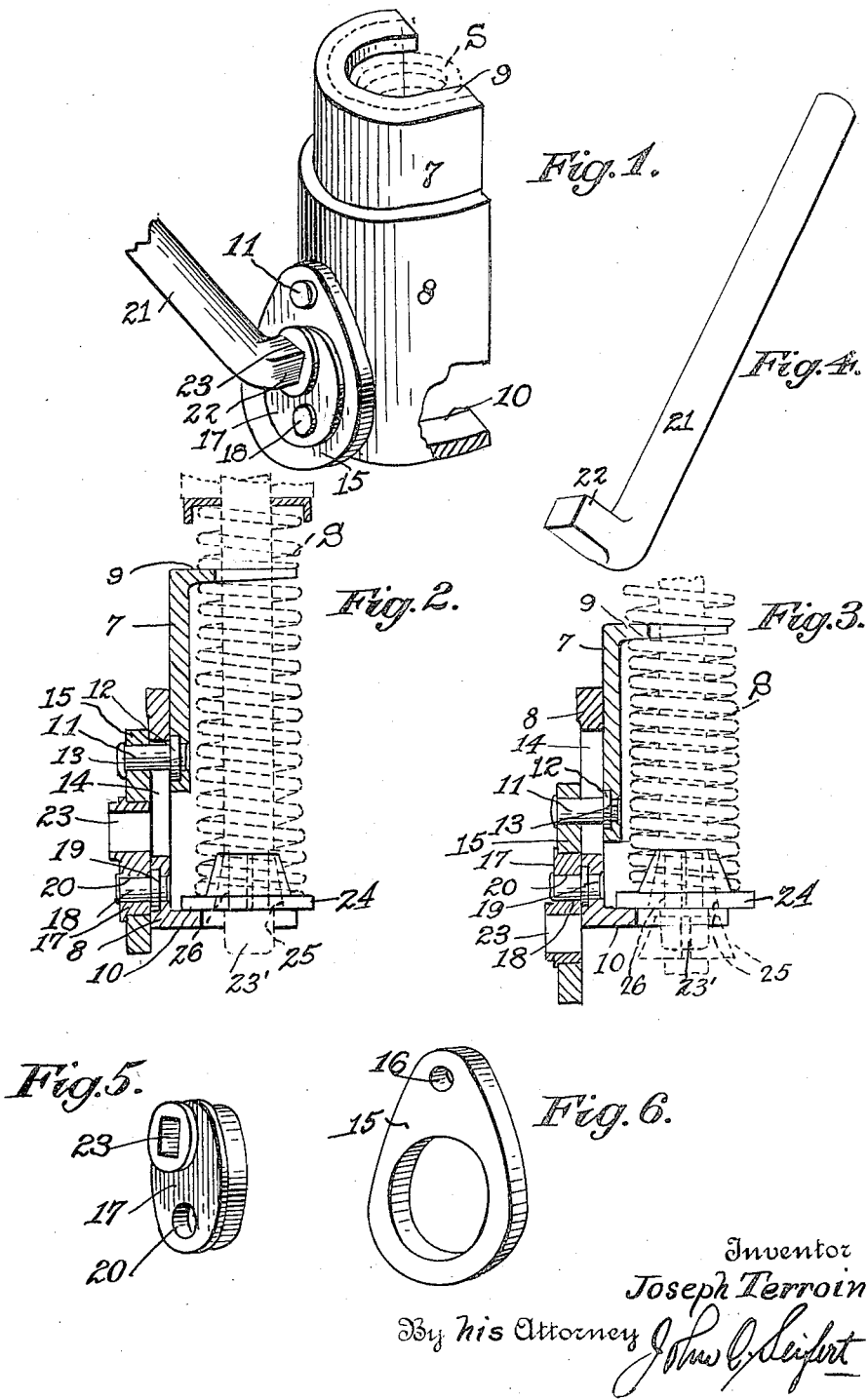

Patented Sept. 18, 1923.

1,468,526

UNITED STATES PATENT OFFICE.

JOSEPH TERROINE, OF NEW YORK, N. Y.

IMPLEMENT FOR COMPRESSING THE VALVE SPRINGS OF INTERNAL-COMBUSTION ENGINES.

Application filed June 16, 1922. Serial No. 568,715.

*To all whom it may concern:*

Be it known that I, JOSEPH TERROINE, a citizen of France, and a resident of the borough of Manhattan, in the city, county, and State of New York, have invented certain new and useful Improved Implements for Compressing the Valve Springs of Internal-Combustion Engines, of which the following is a specification.

This invention relates to an implement to compress the springs of valves in internal combustion engines and hold the same under compression to facilitate the removal of the valves for the purpose of grinding the valves and their seats, and it is the object of the invention to provide an implement for this purpose which is simple and cheap in construction and highly efficient in use.

In carrying out the invention I provide a pair of telescopable members each of which is arranged at one end to engage a spring and be applied to the spring laterally thereof and to also embrace the side of the spring, means being provided to connect said members in sliding relation, which means is also operable to adjust the members relative to each other and retain them in adjusted position.

In the drawing I have shown an embodiment of the invention in which Figure 1 is a perspective view showing the telescopable members extended and in condition to be applied to a spring, and showing the means to actuate the connection means of said members to adjust the members relative to each other.

Figure 2 is a longitudinal sectional view with the members in the position shown in Figure 1 and shown in operative relation to a valve spring previous to compressing the spring.

Figure 3 is a view similar to Figure 2, but showing the parts adjusted to position to compress a spring to remove the spring supporting key from a valve stem.

Figure 4 is a perspective view of the crank for adjusting the telescopable members; and Figures 5 and 6 are perspective views of the means to operatively connect the telescopable members.

In the embodiment of the invention illustrated a pair of members 7, 8 of U-shape in cross section are arranged in telescopable or sliding relation, each of said members having at the outer end an inwardly extending flange, as shown at 9 and 10. These members are formed up from sheet metal whereby they are expeditiously and cheaply manufactured.

The members 7 and 8 are connected in telescopable or sliding relation through an eccentric link connection comprising a stud 11 having an annular enlargement 12, the stud at one side of said enlargement engaging in a perforation in the member 7 and having the end upset to rivet or secure the stud to said member, as shown at 13. The portion of the stud at the opposite side of the enlargement 12 engages in a slot 14 in the member 8 and has an annulus 15 (Figure 6) pivotally mounted or hung thereon by the stud engaging in a perforation 16 in an extended portion of the annulus. A disk 17 (Figure 5) is rotatably mounted within the opening of the annulus and is connected to the member 8 to operatively connect the same with the member 7 by a shouldered stud 18 having one end engaging and secured in an opening in the member 8, as shown at 19, the opposite end of the stud being loosely mounted in a perforation 20 in the disk 17 eccentric to the axis thereof and about which the disk is adapted to be rotated. It will be obvious that by rotating the disk 17 upon the stud 18 within the annulus that the stud 18 will be moved toward and away from the stud 11 and the members 7, 8 moved relative to and away from each other.

To facilitate the rotating of the disk 17 it is arranged for the application of an actuator such as a crank 21 (Figure 4), comprising a bar having an angle portion 22 to removably engage in an opening or socket 23 arranged in the disk 17 eccentric to the axis thereof and substantially diametrically opposite to the opening 20, the disk being preferably arranged with a boss where this opening is located to add rigidity thereto. To prevent rotation of the actuator in the opening 23 in the disk the portion 22 of the actuator is made square in cross section and the opening is correspondingly formed. It will be obvious that the actuating crank may be inserted into the disk opening from various angular positions relative to the disk whereby the disk may be rotated from various positions.

In use the disk 17 is actuated to adjust the members 7, 8 to extended position shown in Figures 1 and 2. In this position the implement is applied laterally to the spring S usually encircling or coiled about the valve stem 23′ with the flange 9 of the member 7 to engage a coil adjacent the upper end of the spring and the flange 10 of the member 8 to engage below the usual washer 24 to seat the valve upon a key 25. The form of valve shown is that of the engine of the well known Cadillac motor car in which the valve spring is seated upon a truncated conical washer and the key supporting said spring consists of a pair of semi-circular conical segments engaging in an annular recess portion 26 in the valve stem, as clearly shown in Figure 2. The lateral ends of the members 7 and 8 are arranged to extend beyond the transverse center of the spring whereby as the members are adjusted to compress the spring such compression pressure will be exerted with equal force on the spring at opposite sides in a plane axially through the spring and not at one side of the longitudinal axis with the tendency of the spring to be sprung out laterally from between the flanges 9, 10, which is a common fault of valve spring compressing implements of which applicant is aware, and which disadvantage it is one of the objects of the invention to overcome. Furthermore by arranging the members 7, 8 in a form of a sleeve the members will embrace at least one half of the circumferential surface of the coils of the spring and thereby prevent any tendency of the spring to move laterally under the spring compressing forces. With the implement applied to the spring as above set forth the disk 17 is rotated by the crank causing the studs to move adjacent to each other and thereby moving the members 7, 8 relative to each other and compressing the spring as shown in Figure 3. This movement need only be sufficient to relieve the pressure of the spring upon the valve stem key supporting the spring washer when the key may be readily removed from the valve stem by sliding the spring longitudinally on the valve stem away from the key 25 as shown in dotted lines in Figure 3 when the valve is withdrawn from the spring, when the implement with the spring may be placed at one side and the valve manipulated to grind the same to its seat. Owing to the mounting of the disk within the annulus the members 7, 8 will be retained in any position to which they may be adjusted through the rotary movement of the disk.

To replace the valve spring all that is necessary is to position the implement with the spring in position for the insertion of the valve stem when the spring supporting key is inserted into the valve stem recess and the disk 17 is adjusted to extend the members 7, 8 until the spring seating washer engages with the valve stem key 25 when the implement may be withdrawn from the spring by a lateral movement thereof.

Having thus described my invention I claim:

1. In a valve spring compressing implement, a pair of telescopable members constructed and arranged to be applied to the spring laterally thereof, each of said members having an inwardly extending flange at one end to engage a spring, and a pair of concentrically movable members, one of the concentric members being eccentrically connected to one telescopable member and the other concentric member eccenerically connected to the other telescopable member for the purpose specified.

2. In a valve spring compressing implement, a pair of telescopable members constructed and arranged to be applied to the spring laterally thereof, each of said members having an inwardly extending flange at one end for the engagement of a spring therebetween, an annulus connected to one of the telescopable members, and a disk within the opening of the annulus pivotally connected eccentrically thereof to the other of said members, and said disk arranged for the application of an actuator to rotate the same for the purpose specified.

3. In a valve spring compressing implement, a pair of telescopable members constructed and arranged to be applied to the spring laterally thereof, each of said members having an inwardly extending flange at one end for the engagement of a spring therebetween, an annulus, a stud fixed in one of the telescopable members slidably engaging in a slot in the other of said members on which the annulus is hung, a disk loosely engaging in the opening of the annulus, a stud fixed in the telescopable member having the slot upon which the disk is rotatably mounted eccentric to the axis thereof, said disk being arranged for the application of a crank to rotate the same within the annulus about its support upon the stud for the purpose specified.

Signed at the city of New York, in the county of New York and State of New York, this 12th day of June, 1922.

JOSEPH TERROINE.